(12) United States Patent
Fortune et al.

(10) Patent No.: US 11,084,373 B2
(45) Date of Patent: Aug. 10, 2021

(54) TRANSMISSION MOUNTED ELECTRICAL CHARGING SYSTEM AND DUAL DRIVELINE LOAD COUPLING

(71) Applicant: Eaton Intelligent Power Limited, Dublin (IE)

(72) Inventors: Glenn Clark Fortune, Farmington Hills, MI (US); Mihai Dorobantu, Richland, MI (US)

(73) Assignee: Eaton Intelligent Power Limited, Dublin (IE)

( * ) Notice: Subject to any disclaimer, the term of this patent is extended or adjusted under 35 U.S.C. 154(b) by 128 days.

(21) Appl. No.: 16/183,442

(22) Filed: Nov. 7, 2018

(65) Prior Publication Data
US 2019/0135107 A1    May 9, 2019

Related U.S. Application Data

(60) Provisional application No. 62/582,397, filed on Nov. 7, 2017.

(51) Int. Cl.
*B60K 17/28*       (2006.01)
*F16H 3/093*       (2006.01)
(Continued)

(52) U.S. Cl.
CPC ............... *B60K 17/28* (2013.01); *B60K 1/00* (2013.01); *B60K 6/26* (2013.01); *B60K 6/28* (2013.01);
(Continued)

(58) Field of Classification Search
CPC . B60K 17/28; B60K 1/00; B60K 6/26; B60K 6/28; B60K 6/40
See application file for complete search history.

(56) References Cited

U.S. PATENT DOCUMENTS 6,600,980 B1    7/2003  Kraska et al.
6,878,092 B1 *  4/2005  Schustek .............. B60H 1/3222
                                                        477/3
(Continued)

FOREIGN PATENT DOCUMENTS

DE    4204384 A1    8/1993
EP    2264334 A1   12/2010
(Continued)

OTHER PUBLICATIONS

Christoph Woernle, Counter Shaft Transmission Used for Automobile, Aug. 22, 2003, EPO, JP 2003-232412 A, English Abstract (Year: 2003).*
(Continued)

*Primary Examiner* — James A English
(74) *Attorney, Agent, or Firm* — GTC Law Group PC & Affiliates (57) ABSTRACT

A system includes a PTO device that selectively couples to a driveline of a vehicle at each of two driveline coupling positions, and a motor/generator electrically coupled to an electrical power storage system. The system further includes a shared load selectively powered by the driveline or the motor/generator. The PTO device further includes a coupling actuator that couples the shared load to the motor/generator in a first position, and couples the shared load to the driveline in a second position.

5 Claims, 2 Drawing Sheets

(51) Int. Cl.
*B60K 6/28* (2007.10)
*B60K 6/40* (2007.10)
*B60K 6/26* (2007.10)
*B60K 1/00* (2006.01)
*B60K 25/00* (2006.01)

(52) U.S. Cl.
CPC ............... *B60K 6/40* (2013.01); *B60K 25/00* (2013.01); *F16H 3/093* (2013.01); *B60K 2025/005* (2013.01); *B60Y 2200/92* (2013.01)

(56) References Cited

U.S. PATENT DOCUMENTS

| | | | |
|---|---|---|---|
| 9,315,187 B2 * | 4/2016 | Stenson | ............... B60W 20/10 |
| 9,579,964 B2 * | 2/2017 | Piazza | ................... B60K 6/547 |
| 9,794,630 B2 | 10/2017 | Sanchez-Leighton | |
| 10,071,662 B2 | 9/2018 | Choi et al. | |
| 2002/0104397 A1 | 8/2002 | Bowen | |
| 2007/0267233 A1 | 11/2007 | Wenthen | |
| 2007/0284159 A1 | 12/2007 | Takami et al. | |
| 2008/0130223 A1 | 6/2008 | Nakamura et al. | |
| 2009/0140694 A1 | 6/2009 | Zeng | |
| 2009/0228150 A1 | 9/2009 | Alston | |
| 2010/0078234 A1 | 4/2010 | Bissontz | |
| 2010/0114442 A1 | 5/2010 | Kadota | |
| 2010/0219007 A1 * | 9/2010 | Dalum | ................... B60L 1/003 180/65.22 |
| 2011/0120160 A1 | 5/2011 | Dietrich | |
| 2011/0126652 A1 | 6/2011 | Genise et al. | |
| 2011/0307153 A1 | 12/2011 | Razaznejad et al. | |
| 2012/0240723 A1 | 9/2012 | Gluckler et al. | |
| 2013/0053201 A1 | 2/2013 | Holmes et al. | |
| 2013/0058801 A1 | 3/2013 | Cheng et al. | |
| 2014/0027089 A1 | 1/2014 | Hisada | |
| 2015/0135863 A1 * | 5/2015 | Dalum | ................... B60K 17/28 74/11 |
| 2015/0207344 A1 * | 7/2015 | Wang | ................... B60L 58/16 180/65.21 |
| 2017/0001622 A1 | 1/2017 | Lindstrom et al. | |
| 2018/0001740 A1 | 1/2018 | Vehr et al. | |
| 2019/0140474 A1 * | 5/2019 | Stoltz | ................... B60K 17/28 |
| 2019/0193524 A1 | 6/2019 | Stoltz | |
| 2020/0114757 A1 | 4/2020 | Gasparovic et al. | |
| 2020/0247239 A1 | 8/2020 | Stoltz | |
| 2020/0254865 A1 | 8/2020 | Stoltz et al. | |
| 2020/0404804 A1 | 12/2020 | Stoltz et al. | |

FOREIGN PATENT DOCUMENTS

| | | | |
|---|---|---|---|
| EP | 2957444 A1 | 12/2015 | |
| EP | 3300239 A1 | 3/2018 | |
| FR | 2835301 A1 | 8/2003 | |
| JP | S58128926 A | 8/1983 | |
| JP | 2003232412 A * | 8/2003 | ............. B60K 6/547 |
| JP | 2012105419 A | 5/2012 | |
| JP | 2014011926 A | 1/2014 | |
| WO | 02078987 A2 | 10/2002 | |
| WO | 2013113103 A1 | 8/2013 | |
| WO | 2017079423 A1 | 5/2017 | |
| WO | 2018085406 A1 | 5/2018 | |
| WO | 2019092023 A2 | 5/2019 | |
| WO | 2019092026 A1 | 5/2019 | |
| WO | 2019092023 A3 | 7/2019 | |
| WO | 2020187989 A1 | 9/2020 | |

OTHER PUBLICATIONS

Christoph Woernle, Counter Shaft Transmission Used for Automobile, Aug. 22, 2003, EPO, JP 2003-232412 A, Machine Translation of Description (Year: 2003).*
PCT/EP18/80485, "International Application Serial No. PCT/EP18/80485, International Search Report and Written Opinion dated Mar. 1, 2019", Eaton Corporation, 15 pages.
PCT/EP2018/080480, "International Application Serial No. PCT/EP2018/080480, Invitation to Pay Additional Fees and, Where Applicable, Protest Fee dated Mar. 20, 2019", Eaton Corporation, 12 pages.
PCT/US2016/060308, "International Application Serial No. PCT/US2016/060308, International Search Report dated Feb. 15, 2017", Eaton Corporation, 8 pages.
PCT/US2017/059541, "International Application Serial No. PCT/US2017/059541, International Search Report and Written Opinion dated Feb. 8, 2018", Eaton Corporation, 17 pages.
PCT/EP2020/057458, "International Application Serial No. PCT/EP2020/057458, International Search Report and Written Opinion dated Jun. 16, 2020", Eaton Corporation, 10 pages.
20170308.9, "European Application Serial No. 20170308.9, Extended European Search Report dated Sep. 21, 2020", Eaton Intelligent Power Limited, 10 pages.
PCT/EP18/80480, "International Application Serial No. PCT/EP18/80480, International Search Report and Written Opinion dated Jun. 19, 2019", Eaton Corporation, 21 pages.

* cited by examiner

TRANSMISSION MOUNTED ELECTRICAL CHARGING SYSTEM AND DUAL DRIVELINE LOAD COUPLING

CROSS REFERENCE TO RELATED APPLICATIONS

This application claims priority to U.S. Provisional Patent Application Ser. No. 62/582,397, filed 7 Nov. 2017, and entitled "POWER TAKE-OFF POWER GENERATION".

The above patent document is incorporated herein in the entirety.

GOVERNMENT LICENSE RIGHTS

This invention was made with government support under government contract #DE-EE008265 awarded by the US Department of Energy. The government has certain rights in the invention.

FIELD

The present disclosure relates generally to a driveline PTO system and related method for operating a motor/generator with shared load management between the driveline and the motor/generator.

BACKGROUND

The use of electrification of loads and accessories for vehicles is increasing for a number of reasons. Electrified accessories and loads allow for greater control, utilization of otherwise wasted energy such as braking and regenerative energy, and provide for incremental improvements toward fully electric vehicles that do not have combustion engines, and (depending upon the source of electrical energy) that can potentially reduce the production of greenhouse gases. Additionally, it is desirable to reduce non-useful operating time for prime movers, such as idling internal combustion engines when motive power is not required.

Presently known systems for electrically powering loads on a vehicle suffer from a number of challenges. Fully electric systems, such as a series hybrid electrified system, suffer from inefficiencies such as two-way electric power conversion (e.g., from DC to AC, and then back to DC), and/or require that systems be oversized relative to the required load to ensure that the system can regenerate or recharge batteries while at the same time powering the load. Additionally, fully electric systems for many loads require high voltages to ensure reasonably sized connections and electric conduits. However, high voltage systems require additional integration and testing work, expensive connectors, and/or isolated grounding systems to ensure they are safe. Further, many vehicles presently on the road retain internal combustion engines as a prime mover, and full electrification of loads and accessories cannot readily be integrated with systems having a highly capable non-electric prime mover without redundancy and expense.

Presently known electrical storage systems for medium capability electrical systems additionally suffer from a number of challenges. High capability battery technologies such as lithium ion require careful control of battery pack charge, temperature environment for the battery, and are expensive to implement, install, and replace. Lower capability battery technologies require large numbers of heavy batteries to provide sufficient useful storage under presently known operation and management techniques.

SUMMARY

An example system and method includes a driveline power take off (PTO) device that selectively provides power to a shared load utilizing driveline power and/or stored electrical power. An example system and method includes a driveline PTO device that applies selected gear ratios between a motor/generator and a shared load, between the motor/generator and the driveline, and/or between the driveline and the shared load.

Example systems and methods herein provide for capability to support multiple load types and duty cycle requirements, including loads having multiple electrical interface requirements. Example systems and methods herein provide for capability to remove one or more aspects of presently known systems, including in certain embodiments a starting motor, one or more belt driven accessories, redundant heating and air conditioning (HVAC) systems, auxiliary power units (APUs), and/or separated battery packs for storing power for offline operation and prime mover starting.

Example systems and methods herein provide for interfacing between electrical systems on a vehicle, and advantageously utilizing available systems to generate additional capability and efficient use of energy sources. Example systems and methods herein flexibly support a number of potential loads, including compressor/HVAC loads, mixers, hydraulic pumps, fuel pumps, exhaust gas recirculation (EGR) pumps, any PTO load, hoteling loads, and/or any accessory load. Example systems and methods herein have a variety of power capabilities for supported loads, including loads up to at least a 5 kW nominal load, a 10 kW nominal load, a 15 kW nominal load, and/or a 30 kW nominal load. Example systems and methods herein are additionally capable of supporting peak and/or transient loads that are higher than the nominal loads. Example systems and methods herein include more than one PTO device for certain applications.

BRIEF DESCRIPTION OF THE DRAWINGS

The present disclosure will become more fully understood from the detailed description and the accompanying drawings, wherein.

DETAILED DESCRIPTION

As will become appreciated from the following discussion, the instant disclosure provides embodiments that support powering one or more loads in a shared manner between a driveline and a PTO (PTO) device, and/or replaces one or more aspects of previously known vehicle electrical systems and/or belt driven powering interfaces for devices. While the disclosure throughout contemplates using the apparatus, system, and process disclosed to drive an auxiliary load, for clarity of description, one or more specific loads such as a fuel pump, an EGR pump, an HVAC, a mixer, and/or hydraulic pump may be referenced in certain examples. All references to specific load examples throughout the present disclosure are understood to include any load that can be powered electrically and/or with a rotating shaft. Further, while the disclosure throughout contemplates using the apparatus, system, and process disclosed as coupled with a motive load, for simplicity the description herein may refer to the motive load as a driveline and/or as a wheeled system. All references to specific motive loads throughout this disclosure should also be understood to be references to any motive load and/or portion of a driveline between a prime mover and a final motive engagement (e.g., wheels, tracks, etc.)

In an example, in commercial long-haul class 8 vehicles, commonly referred to as "18-wheeler sleeper cabs", traditionally a front-end accessory drive (FEAD) powers accessory components such as the electrical charging system (e.g., the alternator), the compressor that drives the HVAC air conditioner, fans, power steering, air compressors, fluid pumps, and/or other accessory loads depending upon the specific implementation. Historically, operators of such vehicles would run the engine nearly all the time including while driving for propulsion and idling while stopped to maintain the accessory functions such as "hotel loads" including lights, television, refrigerator, personal devices (e.g., a CPAP, electronic device charging, etc.), and HVAC cooling in summer months. In an effort to improve fuel economy and/or reduce emissions, fleet policy and laws in many locations prohibit idling for extended periods of time. Many solutions to provide the required electricity and cooling have been commercialized, including the addition of a small engine for that function (APU), addition of batteries that run an electrical air conditioner that are charged while driving, utilization of locations that have shore power available, and/or periodic cycling of the engine.

Previously known systems have followed two paths for engine off air conditioning. In a first implementation, the existing belt driven compressor is used while driving and a second electrically driven compressor is used while the engine is off. Such a solution adds cost and complexity. In a second implementation, a purely electrically driven compressor is operated for all of the HVAC demand. The disadvantage of a full-time electric HVAC system are two-fold: First, the increase in power demand exceeds the available power in 12V systems driving the industry to higher system voltage (especially 48V). Secondly, the system efficiency suffers when the engine shaft power is converted to electricity then converted back to shaft power to drive the compressor while driving.

References throughout the present disclosure to any particular voltage level should be understood to include both nominal voltages (e.g., a 12V battery) and actual system voltages. For example, a nominal 12V lead-acid battery typically operates at 14V or 14.5V during operations where the battery is in electrical communication with a charging device such as an alternator. Further, a nominal 12V battery may operate below 12V during discharge operations such as during cranking, and may be as low as 10.5V during certain operations. Further still, while certain voltages are described herein for clarity of description and due to ordinary terminology in industry (e.g., 12V, 48V, etc.), it will be understood that the features of the present disclosure are applicable to a wide range of voltages, and the specific voltages described are not limiting. For example, a nominal 48V system may be 56V or 58V during certain operations of a system, or as low as 42V during other operations of the system. Additionally, without limitation, features and operations for a nominal 48V system may be applicable to a nominal 12V system and/or a 24V. In certain examples, as will be understood to one of skill in the art having the benefit of the present disclosure, some voltage ranges may change the operating principles of a system, such as a high voltage system (e.g., more than 60V) that may require additional aspects to certain embodiments such as a floating ground, and/or a low voltage system where a high power requirement may limit the practicality of such systems. The voltage at which other system effects may drive certain considerations depends upon the specific system and other criteria relating to the system that will be understood to one of skill in the art having the benefit of the present disclosure. Certain considerations for determining what range of voltages may apply to certain example include, without limitation, the available voltages of systems and accessories on a specific vehicle, the regulatory or policy environment of a specific application, the PTO capability of available driveline components to be interfaced with, the time and power requirements for offline power, the availability of regenerative power operations, the commercial trade-offs between capital investment and operating costs for a specific vehicle, fleet, or operator, and/or the operating duty cycle of a specific vehicle.

The present disclosure relates to PTO devices having a motor/generator, where the PTO device is capable to selectively transfer power with the driveline, such as at a transmission interface. In embodiments, a 48V PTO may replace the traditional engine mounted, belt driven alternator, HVAC compressor, and/or the flywheel mounted brush starter with a transmission PTO mounted electrical machine on a common shaft with the HVAC compressor. The disclosed PTO device accessories on the transmission enable several modes of operation, independent of engine speed, using proven parts such as simple planetary gears and shift actuators. Without limitation, example PTO devices disclosed herein allow for operating the load (e.g., an HVAC compressor) with the same electric machine used to charge the battery while driving and/or during engine-off operations such as sleeping, hoteling, or waiting (e.g., at a loading dock, construction site, or work site), and the ability to operate the charging and load mechanically from the driveline (e.g., during coasting or motoring). In certain embodiments, an example PTO system reduces total ownership costs and/or enhances the ability to meet anti-idling requirements while allowing the operator to maintain climate control or other offline operations. An example system also improves system economics for the vehicle manufacturer, fleet, owner, or operator, by reducing green-house gas (GHG) emissions, improving fuel economy, improving operator comfort and/or satisfaction, and enabling original equipment manufacturer (OEM) sales of various feature capabilities supported by the PTO system. Certain example systems disclosed herein have a lower initial cost than previously known systems (e.g., diesel or battery APUs and/or redundant HVAC systems) while providing lower operating costs and greater capability.

In embodiments, a PTO device can be mounted to a driveline, such as a transmission. A power system can be charged, for example, a lead battery. Then, the power system can be utilized to power a device such as an HVAC system via the PTO device. Also, the power system can be utilized during start-up of an affiliated engine or vehicle prime mover.

In one example, a 48V PTO enables "anti-idle" technologies, such as no-idle hoteling with an e-driven AC compressor. Such an arrangement reduces green-house gasses when, for example, a sleeper cab of a long-haul tractor is placed in a hotel mode. However, the PTO is not limited to such a vehicle and the PTO can be applied to other vehicles.

Engine-off operations such as coasting or motoring can be used to regeneratively charge the 48V power system and/or mechanically power a shared load. Electricity can be routed to assist power steering during engine-off operations. Other aspects of engine-off operations, intelligent charging, electrical HVAC, and/or stop/start modes complement the disclosed PTO device. The PTO device improves fuel economy by converting otherwise wasted energy to usable electricity and achieves a reduction in green houses gases.

The design can eliminate other engine-mounted components to reduce vehicle weight and integration costs, and to reduce the engine system footprint. For example, it is possible to utilize a PTO device in lieu of one or more of a traditional alternator, starter, and/or AC compressor. In certain embodiments, redundant systems can also be eliminated. For example, some previously known systems include a first circuit relying on the engine for power to evaporative circuits and the air conditioning. Then, a second system is mounted for engine-off operations, which second system also includes an evaporation circuit and an air conditioning circuit.

In another example, the alternator port and AC compressor port can be removed from the engine, allowing for a reduction in component and integration costs, and reducing parasitic loads on the engine. In certain embodiments, aspects of a starter can be omitted, for example where the PTO device is utilized to start the engine. The auxiliary drive aspect of the PTO device can couple to the evaporator circuits and the air conditioner. In an example, the air conditioner does not couple through the engine, but through the PTO device. When needed, the AC compressor and electric alternator can be moved from engine-mounted to mounting on the PTO device, which may be mounted to an interface on the transmission.

An example auxiliary drive includes the air conditioner (AC) and/or other powered electrical systems. Regenerated coasting energy can be captured via the motor/generator coupled to the driveline, and later utilized to power electrical loads on the vehicle. An example system includes managed lead acid batteries. The electrical system can include an air-cooled system.

An example PTO device includes a motor/generator having a motor rating of 5 kW continuous output and 10 kW peak output. The motor can be used as part of the motor/generator. Various motor types are compatible with the disclosure, including permanent magnet type, wire-wound synchronous type, and induction motor type. External excitation can be applied to the wire-wound synchronous type motor. Other components can include a housing or other adapter for the PTO device, gearing to couple to the transmission or other driveline component to the PTO device, gearing to step up or down between the motor/generator, auxiliary drive, and/or transmission or driveline. An example PTO device includes a gear change actuator such as a gear selector, an inverter, a converter, and/or an electric steering circuit. The disclosed PTO device variants provide numerous benefits, including in certain embodiments: capturing motive energy that would be otherwise lost, prime mover stop/start mode operation, intelligent charging, reduced system and system integration costs, and fuel savings. Certain embodiments include fewer engine-mounted components, reducing the engine footprint, and improving driver visibility around the engine via reductions in the mounting space. Certain embodiments provide for a reduced load on the serpentine belt. Certain embodiments provide for higher system power within the same footprint, and/or for greater utilization of system power and reduced overdesign of power to support variability in applications and duty cycles.

Figure 1:
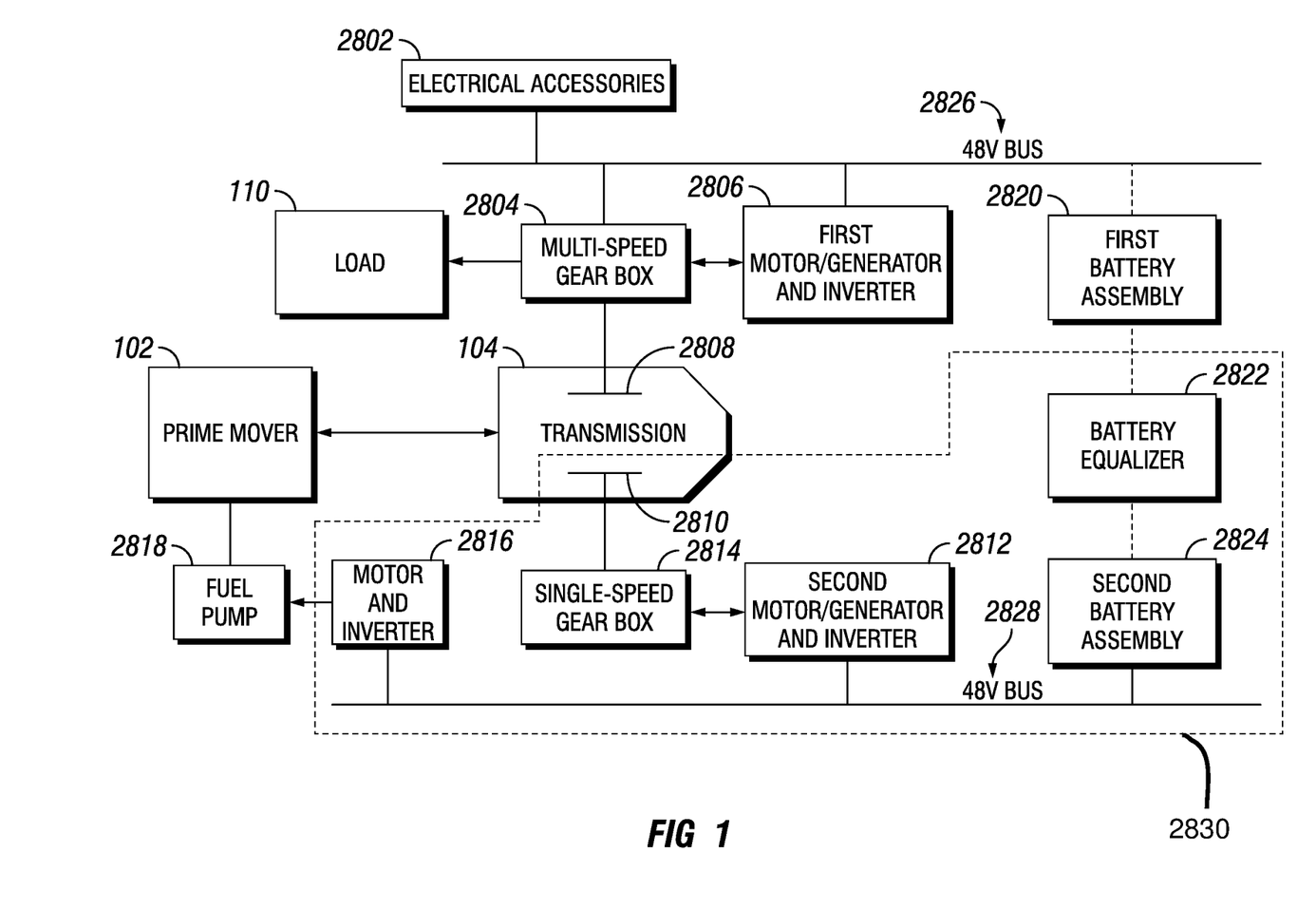
FIG. 1 is a schematic depiction of an example system having two PTO devices interfacing with a driveline.

Referring to FIG. 1, an embodiment functional block diagram is provided for an PTO device configured with a prime mover 102 (e.g., an internal combustion engine) coupled with a transmission 104. Various controllers (not shown) may be present and associated with one or more of the engine, the transmission, the vehicle, and/or one or more PTO devices. The controllers may provide control functions for the engine, transmission, vehicle, and/or PTO devices.

In embodiments, a PTO device may include a motor/generator (M/G) 2806, 2812 and a load 110, 2818 (e.g., an HVAC system or a fuel pump 2818) drivingly coupled by a gear box 2804, 2814 that is further drivingly coupled to the transmission 104. The coupling to the transmission 104 may be with an idler gear, a chain, or other coupling device to a gear in the transmission. An example includes coupling the gear box 2804, 2814 to a countershaft of the transmission, and/or coupling each gear box 2804, 2814 to separate countershafts of the transmission. In certain embodiments, a gear box 2804, 2814 may be coupled to a countershaft of the transmission using a spline shaft engaging the countershaft.

Each motor/generator 2806, 2812 is provided drive and control signals from a motor drive converter (MDC) 114 or other controller that is powered by a battery assembly 2820, 2824.

In embodiments, each motor drive controller (MDC) 2806, 2812 may be a combined motor drive and DC-DC converter intended to support electrification of vehicles, such as using a multi-rail 48V/12V architecture. The motor drive supports starter and generator operation of a motor/generator 2806, 2812 (e.g., a permanent magnet synchronous motor, wire-wound synchronous motor, induction motor, and the like) and the DC-DC converter bridges system voltages (e.g., a 48V system and a 12V system with bidirectional power flow).

Referencing FIG. 1, an example PTO device is depicted. In the example of FIG. 1, a first PTO device (e.g., multi-speed gear box 2804, first motor/generator and inverter 2806, and/or first battery assembly 2820) and a second PTO device 2830 are coupled to the driveline, for example with a multi-speed gear box 2804 engaging a first countershaft 2808 of the transmission 104, and a single-speed gear box 2814 engaging a second countershaft 2810 of the transmission 104. The first PTO device, in certain embodiments, further includes a first motor/generator 2806 and/or a first load 110. The second PTO device 2830, in certain embodiments, further includes a second motor/generator 2812 and a second motor and inverter 2816, for example to power a second load 2818 (a fuel pump in the example of FIG. 1). The example of FIG. 28 further includes a battery assembly associated with each of the PTO devices (e.g., a first battery assembly 2820 associated with the first PTO device, and a second battery assembly 2824 associated with the second PTO device). The example of FIG. 28 further includes a battery equalizer 2822, which may include controls, circuits, hardware, and/or other features to balance loads between the battery assemblies 2820, 2824. In certain embodiments, the battery assemblies 2820, 2824 may not be in electrical communication, may not be at the same voltages, and/or the PTO devices may share a single battery assembly. The example of FIG. 1 further includes one or more 48V power buses 2826, 2828, which may be at the same voltage level, may be in communication with each other (or form the same bus), and/or may be isolated from each other. In the example of FIG. 1, the first PTO device is in communication with electrical accessories 2802, and may be configured to support those electrical accessories 2802, for example by controlling storage in the first battery assembly 2820 to ensure that power is available for the electrical accessories 2802 during sleep and/or engine-off operating conditions. The arrangement depicted in FIG. 1 is a non-limiting arrangement, and the configuration of loads, buses, and gear boxes is an example for purposes of illustration.

It will be seen that the capabilities of a PTO device can be improved with the addition of another PTO device. For example, gear ratio selections, motor sizing and selection, and battery assembly sizing and selection can be more optimized for the individual loads supported by each of the PTO devices. Additionally, in certain embodiments, accessing driveline power from a second location can balance the loads on the driveline, allowing for a greater amount of power to be transferred with the driveline without a corresponding increase in disturbance of the driveline.

Figure 2:
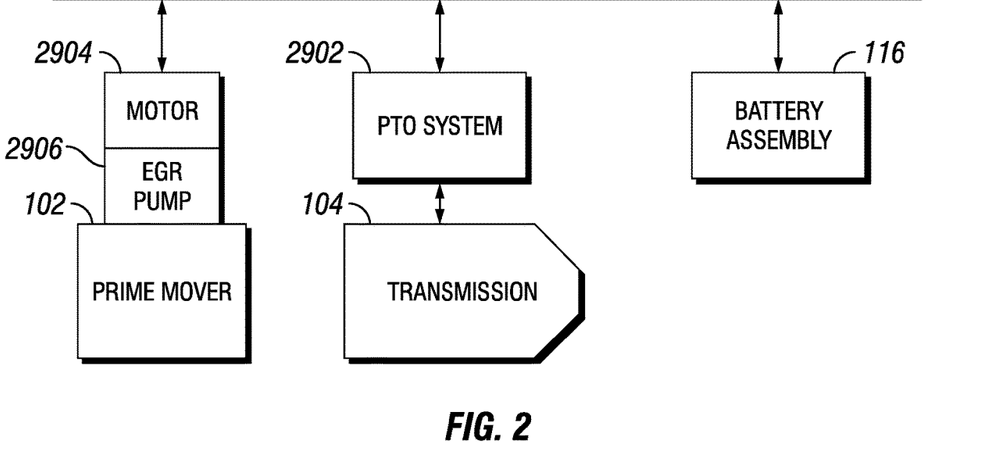
FIG. 2 is a schematic depiction of an example system having a PTO device interfacing with a driveline.

Referencing FIG. 2, an example system includes a PTO device (e.g., PTO system 2902) that exchanges power with a driveline, and provides power to a selected voltage bus (e.g. a 48V bus). The example PTO device includes a battery assembly 116 electrically coupled to the bus, and a motor 2904 electrically powered by the bus and operationally coupled to an exhaust gas recirculation (EGR) pump 2906. In the example of FIG. 2, the PTO device 2902 may be the only PTO device present on the system, and/or may be a second PTO device (where the first PTO device is not shown).

Figure 3:
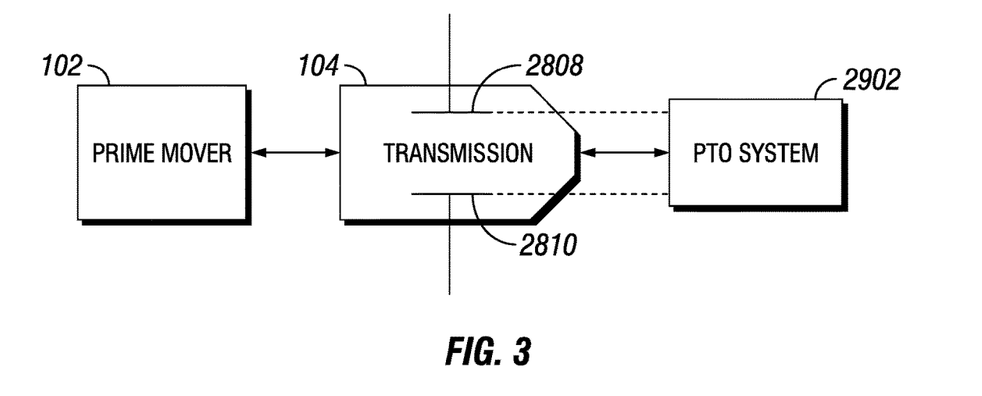
FIG. 3 is a schematic depiction of an example system having a single motor/generator interfacing with a driveline at two distinct locations.

Referencing FIG. 3, an example system includes a PTO device (e.g., PTO system 2902) having two torque coupling interfaces to a driveline for example accessing each countershaft of a twin countershaft transmission. It can be seen that a single PTO device 2902 with a single motor/generator can nevertheless access a driveline at two separate points, providing load balancing benefits and allowing for greater power transfer with the driveline.

An example system includes a PTO device structured to selectively couple to a driveline of a vehicle at each of two driveline coupling positions; a motor/generator electrically coupled to an electrical power storage system; a shared load selectively powered by one of the driveline or the motor/generator; and where the PTO device further includes a coupling actuator structured to couple the shared load to the motor/generator in a first position, and to the driveline in a second position.

Certain further aspects of an example system are described following, any one or more of which may be present in certain embodiments. An example system includes where each of the two driveline coupling positions includes a torque coupling to a distinct one of two separate countershafts; a second motor/generator, and where each of the torque couplings are mechanically coupled to a separate one of the two motor/generators; where a total electrical power throughput of the two motor/generators exceeds 15 kW; a first mechanical coupling ratio between each of the motor/generators when power flows from the countershafts to the motor/generators, and a second mechanical coupling ratio between each of the motor/generators when power flows from the motor/generators to the countershafts; a second electrical power storage system, and where each of the motor/generators is coupled to a distinct one of the two electrical power storage systems; including an energy storage equalizer structured to balance a state of charge of each of the two electrical power systems; a second shared load, and where each of the two motor/generators are selectively coupled to a distinct one of the two shared loads; and/or where each of the two shared loads comprise at least one load selected from the loads consisting of: a compressor, an exhaust-gas recirculation pump, a fuel pump, a refrigeration unit, a vehicle accessory structured to access at least one of rotating or electrical power, a cement mixer, a hydraulic motor, and a nominal 48V load.

Figure 4:
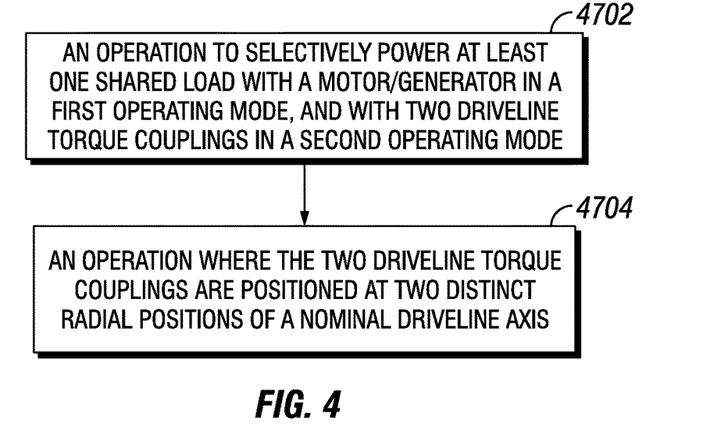
FIG. 4 is a schematic flow diagram of a procedure for operating a PTO device having two interfaces with a driveline.

Referencing FIG. 4, an example procedure includes an operation 4702 to selectively power at least one shared load with a motor/generator in a first operating mode, and an operation 4704 to power the at least one shared load with two driveline torque couplings in a second operating mode, where the two driveline torque couplings are positioned at two distinct radial positions of a nominal driveline axis.

Certain further aspects of an example procedure are described following, any one or more of which may be present in certain embodiments. An example procedure further includes an operation where the two driveline torque couplings each comprise a torque coupling to a distinct countershaft of a twin countershaft transmission. An example procedure further includes an operation to power a single motor/generator with the two driveline torque couplings. An example procedure further includes an operation to power each one of two separate motor/generators with each one of the two driveline torque couplings.

An example system includes a PTO device structured to selectively couple to a driveline of a vehicle at each of two driveline coupling positions; a motor/generator electrically coupled to an electrical power storage system; a shared load selectively powered by one of the driveline or the motor/generator; and where the PTO device further includes a coupling actuator structured to couple the shared load to the motor/generator in a first position, and to the driveline in a second position.

Certain further aspects of an example system are described following, any one or more of which may be present in certain embodiments. An example system includes where each of the two driveline coupling positions includes a torque coupling to a distinct one of two separate countershafts; a second motor/generator, and where each of the torque couplings are mechanically coupled to a separate one of the two motor/generators; where a total electrical power throughput of the two motor/generators exceeds 15 kW; a first mechanical coupling ratio between each of the motor/generators when power flows from the countershafts to the motor/generators, and a second mechanical coupling ratio between each of the motor/generators when power flows from the motor/generators to the countershafts; a second electrical power storage system, and where each of the motor/generators is coupled to a distinct one of the two electrical power storage systems; including an energy storage equalizer structured to balance a state of charge of each of the two electrical power systems; a second shared load, and where each of the two motor/generators are selectively coupled to a distinct one of the two shared loads; and/or where each of the two shared loads comprise at least one load selected from the loads consisting of: a compressor, an exhaust-gas recirculation pump, a fuel pump, a refrigeration unit, a vehicle accessory structured to access at least one of rotating or electrical power, a cement mixer, a hydraulic motor, and a nominal 48V load.

An example procedure includes an operation to selectively power at least one shared load with a motor/generator in a first operating mode, and with two driveline torque couplings in a second operating mode, where the two driveline torque couplings are positioned at two distinct radial positions of a nominal driveline axis.

Certain further aspects of an example procedure are described following, any one or more of which may be present in certain embodiments. An example procedure further includes an operation where the two driveline torque couplings each comprise a torque coupling to a distinct countershaft of a twin countershaft transmission. An example procedure further includes an operation to power a single motor/generator with the two driveline torque couplings. An example procedure further includes an operation to power each one of two separate motor/generators with each one of the two driveline torque couplings.

The programmed methods and/or instructions described herein may be deployed in part or in whole through a machine that executes computer instructions on a computer-readable media, program codes, and/or instructions on a processor or processors. "Processor" used herein is synonymous with the plural "processors" and the two terms may be used interchangeably unless context clearly indicates otherwise. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, Internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code, and/or instructions. A central repository may provide program instructions to be executed on different devices. In this implementation, the remote repository may act as a storage medium for program code, instructions, and programs.

The computer readable instructions may be associated with a client that may include a file client, print client, domain client, Internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of a program across the network. The networking of some or all of these devices may facilitate parallel processing of a program or method at one or more location without deviating from the scope. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, LTE, EVDO, mesh, or other networks types.

The methods, programs, codes, and instructions described herein and elsewhere may be implemented on or through mobile devices. The mobile devices may include navigation devices, vehicle remote network access devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM, and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer instructions, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in procedure descriptions, methods, flow charts, and block diagrams imply logical boundaries between the elements. However, any operations described herein may be divided in whole or part, combined in whole or part, re-ordered in whole or part, and/or have certain operations omitted in certain embodiments. As such, the depiction and/or description of an order for various steps should not be understood to require a particular order of execution for those steps, unless required by a particular application, or explicitly stated or otherwise clear from the context. Operations described herein may be implemented by a computing device having access to computer executable instructions stored on a computer readable media, wherein the computing device executing the instructions thereby performs one or more aspects of the described operations herein. Additionally or alternatively, operations described herein may be performed by hardware arrangements, logic circuits, and/or electrical devices configured to perform one or more aspects of operations described herein. Examples of certain computing devices may include, but may not be limited to, one or more controllers positioned on or associated with a vehicle, engine, transmission, and/or PTO device system, personal digital assistants, laptops, personal computers, mobile phones, other handheld computing devices, wired or wireless communication devices, transducers, chips, calculators, satellites, tablet PCs, electronic books, gadgets, electronic devices, devices having artificial intelligence, networking equipment, servers, routers, and the like. Thus, while the foregoing drawings and descriptions set forth functional aspects of the disclosed systems, the descriptions herein are not limited to a particular arrangement of computer instructions, hardware devices, logic circuits, or the like for implementing operations, procedures, or methods described herein, unless explicitly stated or otherwise clear from the context.

The methods and/or processes described above, and steps thereof, may be realized in hardware, instructions stored on a computer readable medium, or any combination thereof for a particular application. The hardware may include a general-purpose computer, a dedicated computing device or specific computing device, a logic circuit, a hardware arrangement configured to perform described operations, a sensor of any type, and/or an actuator of any type. Aspects of a process executed on a computing device may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine-readable medium.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

While the methods and systems described herein have been disclosed in connection with certain example embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

All documents referenced herein are hereby incorporated by reference.

What is claimed is:

1. A system, comprising:
   a PTO device structured to selectively couple to a driveline of a vehicle at each of two driveline coupling positions, wherein each of the two driveline coupling positions comprises a torque coupling to a distinct one of two separate countershafts;
   a first motor/generator electrically coupled to an electrical power storage system and electrically powered by a first power bus;
   a shared load selectively powered by one of the driveline or the first motor/generator;
   wherein the PTO device further comprises a coupling actuator structured to couple the shared load to the first motor/generator in a first position, and to the driveline in a second position;
   a second motor/generator electrically powered by a second power bus, wherein each of the torque couplings are mechanically coupled to a separate one of the two motor/generators;
   a second electrical power storage system coupled to the second motor/generator, wherein the first power bus and the second power bus are isolated from each other; and
   an energy storage equalizer structured to balance a state of charge of each of the two electrical power storage systems.

2. The system of claim 1, wherein a total electrical power throughput of the two motor/generators exceeds 15 kW.

3. The system of claim 1, further comprising a first mechanical coupling ratio between each of the motor/generators when power flows from the countershafts to the motor/generators, and a second mechanical coupling ratio between each of the motor/generators when power flows from the motor/generators to the countershafts.

4. The system of claim 1, further comprising a second shared load, and wherein each of the two motor/generators are selectively coupled to a distinct one of the two shared loads.

5. The system of claim 4, wherein each of the two shared loads comprise at least one load selected from the loads consisting of: a compressor, an exhaust-gas recirculation pump, a fuel pump, a refrigeration unit, a vehicle accessory structured to access at least one of rotating or electrical power, a cement mixer, a hydraulic motor, and a nominal 48V load.

* * * * *